United States Patent [19]
Vits

[11] 3,807,262
[45] Apr. 30, 1974

[54] CUTTER FOR CUTTING SHEETS FROM A WEB

[75] Inventor: Hilmar Vits, Leichlingen, Germany

[73] Assignee: Vits Maschinenbau GmbH, Langenfeld (Rhineland), Germany

[22] Filed: Apr. 22, 1971

[21] Appl. No.: 136,347

[30] Foreign Application Priority Data
Apr. 27, 1970   Germany............................ 2020431

[52] U.S. Cl..................................... 83/117, 83/342
[51] Int. Cl............................ B26d 7/18, B26d 1/56
[58] Field of Search............ 83/341, 342, 343, 345, 83/113, 116, 118, 117

[56] References Cited
UNITED STATES PATENTS

| | | | |
|---|---|---|---|
| 2,478,240 | 8/1949 | Christman............................ | 83/341 |
| 3,000,250 | 9/1961 | Altmann et al................... | 83/345 X |
| 1,148,146 | 7/1915 | Cameron et al..................... | 83/113 |
| 2,372,020 | 3/1945 | Sandberg............................. | 83/118 |
| 2,953,071 | 9/1960 | Heywood....................... | 83/343 UX |

*Primary Examiner*—Andrew R. Juhasz
*Attorney, Agent, or Firm*—Michael S. Striker

[57] ABSTRACT

The web is continuously fed to the cutter, which comprises cutter blade cylinders disposed in a cutting station on both sides of an imaginary center plane through said web. The cutter blade cylinders are rotatable in mutually opposite senses about axes of rotation which are parallel to said center plane in said cutting station. The cutter also comprises drive means for each of said cutter blade cylinders. The drive means are designed to be adapted to impart to a cutter blade cylinder disposed in the cutting station on one side of said center plane through said web a complete revolution about its axis of rotation and to impart during the same time to a cutter blade cylinder disposed in said cutting station on the other side of said center plane complete revolutions about its axis of rotation in a number which is at least two.

8 Claims, 4 Drawing Figures

PATENTED APR 30 1974　　　　　　　　　　　　　　　　　3,807,262

Inventor:

CUTTER FOR CUTTING SHEETS FROM A WEB

This invention relates to a rotary cutter for cutting sheets from a continuously fed web, e.g., of paper, plastics material sheeting, cardboard, or the like in such a manner that the length of each sheet exceeds the length of the flight path traversed by the cutter blade during one revolution.

This object has been accomplished with rotary cross cutters, which are specially designed to perform the desired function. If the rotary cross cutter comprises a rotating upper cutter blade cylinder and a stationary lower cuttr blade, a reliable operation of the cutter can be ensured only if the upper blade moves at least at the velocity of the web during the cut because otherwise the obstruction of the web before the cutter blade would inevitably result in difficulties. Where large sheets are required, these difficulties can be avoided only if the cylinder which carries the upper cutter blade is very large in diameter if the upper cutter blade is to revolve at a uniform speed. If the diameter of the upper cutter blade cylinder is fairly small in order to ensure a strong cutting force, the upper cutter blade cylinder must be driven in such a manner that it moves at a high speed during a major part of each revolution, particularly during the cut itself, and at a lower speed during another part of each revolution. The resulting continual decelerations and accelerations of the drive means impose an upper limit of the speed range in which the rotary cross cutter can be operated with economically acceptable results.

Similar difficulties have arisen in rotary cross cutters which comprise two cutter blade cylinders. In such a cross cutter, the cutter blades approach each other as they revolve along their flight paths so that a scissorlike cut may be obtained. A neat cut will be obtained if the surface velocity of the cutter blades equals the velocity of the web. When it is desired to cut very long sheets, two cylinders must be accelerated and decelerated in alternation during each revolution in order to ensure an approximately synchronous movement of the cutter blade and web during the cut. The means for driving such cross cutter involve a high expenditure because the transmission is complicated and must be very strong and free of backlash. The backlash between the gears is approximately as large as the backlash between the sides of the upper and lower cutter blades and even when cutting thin webs said backlash must be only a fraction of the thickness of the web.

For this reason, rotary cross cutters have been developed more recently in which the lower cutter blade is stationary only temporarily during the cut but can be swung off at other times so that only one cut is performed for every three or four revolutions of the upper cutter blade cylinder. That design has the disadvantage that it involves a high wear of the cutter blades. Besides, a satisfactory mechanism for imparting the fast reciprocation to the cutter blade has not yet been provided. The movements must be soft in order to avoid damage. On the other hand, absolutely hard and rigid stops must be provided to exactly position the lower cutter blade. Nevertheless, dislocations cannot be avoided and involve an undue stressing of the cutting edges of the cutter blades and a high wear of said blades.

In order to ensure a contact between the cutting edges at a point which moves from one end to the other so that a sudden stressing of the cutter blades is avoided. It is also known to provide cutter blade cylinders having cutting edges extending along a helix having a small lead. Such a helical cutting edge may even be provided by cutter blades which have been ground in a straight condition because the deformation of the cutter blade as it is fixed to the cylinder is below the permissible elastic stress. To compensate for the fact that the helical cutting edge results in an oblique cut, the angle between the cutter blade cylinders and the web differs from a right angle.

It is an object of the invention to avoid the above-mentioned difficulties in a very simple manner.

In a cutter which comprises two cutter blade cylinders disposed on both sides of a web which is to be divided into sheets, the above-mentioned object is accomplished in that the cutter blade cylinders are driven at speeds which have a ratio that is an integer other than one.

As a rule, each of the upper and lower cutter blade cylinders is provided with only one cutter blade. For instance, if the speed ratio between the two cylinders is 4:1, the cutter will be able to cut sheets having a length which is about four times the length of the flight path of the cutter blade of the upper cutter blade cylinder during one revolution thereof.

Embodiments of the invention are shown diagrammatically and by way of example in the drawing, in which FIG. 1 is a transverse sectional view taken on a plane which extends at the center of the web through the axes of the upper and lower cutter blade cylinders at right angles to said axes.

Figure 1:
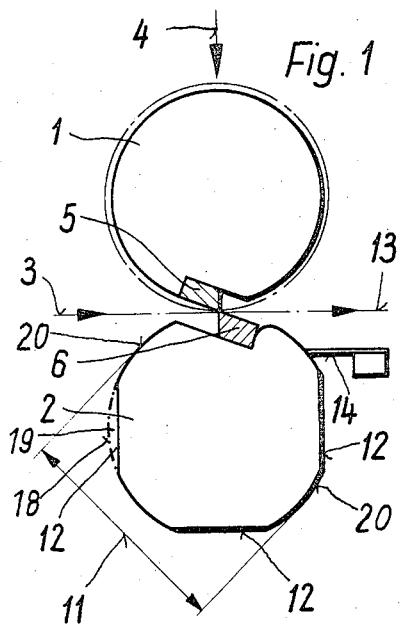

FIG. 1 shows an upper cutter blade cylinder or upper cutter roll 1 and a lower cutter blade cylinder or lower cutter roll 2. The web to be divided into sheets moves in the direction of the arrow 3 from the left to the right between said cylinders. Cross cutters are known in which the cutter blades engage like scissors in the direction of the arrow 4. The present arrangement differs from such known cross cutters in that the upper cutter blade 5 moves in the direction of the arrow 3 in scissor-like engagement with the lower cutter blade 6 because the upper cutter blade 5 moves at a higher velocity than the lower cutter blade 6.

Figure 2:
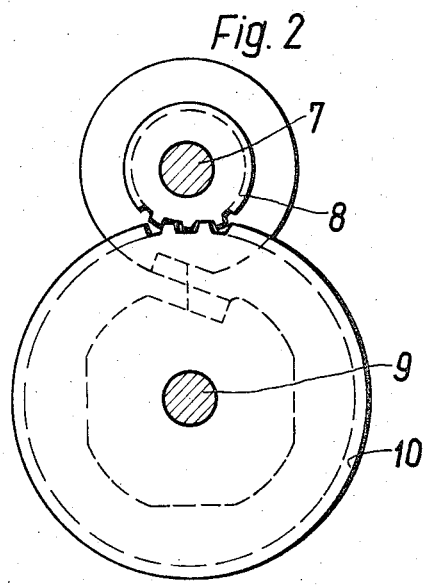
FIG. 2 shows the pair of driving spur gears secured to the stub shafts at one end of the cutter blade cylinders.

FIG. 2 shows the spur pinion 8, which is secured to the stub shaft 7 of the upper cylinder and in mesh with the spur gear 10, which is secured to the stub shaft 9 of the lower cutter blade cylinder. In the present example, the transmission ratio is 3:1.

In FIG. 1, the diameter 11 of the lower cutter blade cylinder exceeds the diameter of the imaginary or flight cylinder (not shown), which is described by the cutting edge of the lower cutter blade 6 during the revolution thereof. For this reason, the cutting edge of the upper cutter blade cylinder can move past the periphery of the lower cutter blade cylinder 2 only if flats 12 are provided on the cylinder 2 in order to avoid damage to the cutting edge of the upper cutter blade cylinder 1. Because the velocity of the leading end of the sheet exceeds the surface velocity of the lower cutter blade cylinder 2 and the paper web has usually a certain curvature, that leading edge will normally tend to adhere to the periphery of the cylinder rather than continuing its movement along a straight line in the direction 13. That danger is eliminated by the scraper 14, which deflects an advancing leading edge of a sheet from the lower cutter blade cylinder 2 toward the delivery station in direction 13.

Figure 3:
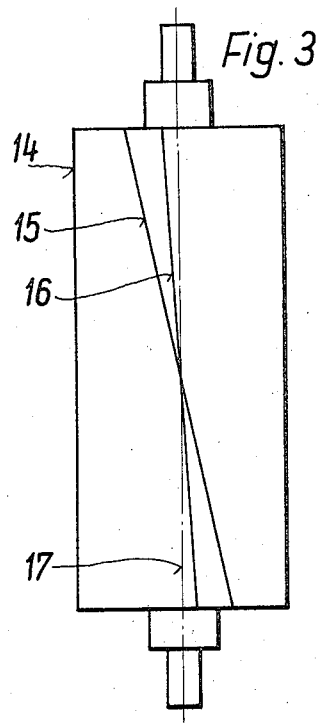
FIG. 3 shows the two cutter blade cylinders with axially aligned axes.

In FIG. 3, lines 14 indicate the projection of the peripheral surface of the upper cylinder 1, which lines coincide here with the lines which represent the projections of the flats 12 on the lower cutter blade cylinder 2. The helical line 15 indicates the cutting edge of the cutter blade 5 of the upper cutter blade cylinder 1. The helical line 16 indicates the cutting edge of the lower cutter blade 6 of the lower cutter blade cylinder 2. The leads of the two helices 15 and 16 are proportional to the surface velocities of the cutter blade cylinders 1 and 2 measured at the flight cylinders of the cutting edges of the cutters. This will ensure that all points of intersection between the upper and lower cutter blades 5 and 6 will lie on the line of contact of the imaginary flight cylinders described by the cutting edges 15 and 16. The points of contact between the upper and lower cutting edges may be described together as a line of cut, which extends transversely to the web and the projections of said line of cut and of the axis 17 of the upper cylinder 2 will coincide along a common line.

Figure 4:
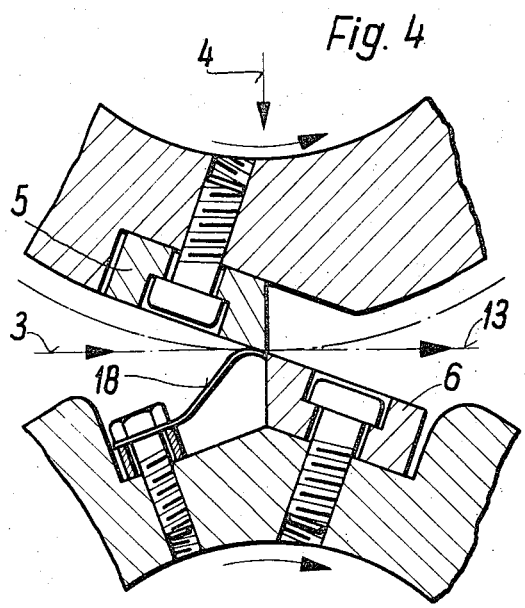
FIG. 4 illustrates a portion of FIG. 1 with special emphasis given to the cutter blades.

FIG. 4 shows the arrangement of the cutter blades more in detail. In the direction of rotation, the lower cutter blade 6 is succeeded by a leaf spring 18, which is disposed within the flight cylinder of the cutting edge and extends across the web. That leaf spring lifts the leading edge (not shown) of the web above the cutting edge of the lower blade 6. That measure is desirable because the surface velocity of the lower cutter blade cylinder 2 is lower than the velocity of the web to be cut into sheets. The leaf spring 18 is held at a portion remote from the cutting edge of the cutting blade 6 by gripping means shown in FIG. 4 as a screw.

With the cross cutter described with reference to FIGS. 1 to 4, the object of the invention can be accomplished in a very simple manner because the peripheral velocities of the two cutter blades can be maintained constant in operation so that they can be driven in an easy and simple manner. Because the cut is not performed in a vertical plane in the direction 4, as in the known cross cutters, but in a tangential direction 3 along the line of contact between the imaginary flight cylinders described by the two rotating cutting edges, the requirements as to the accuracy of the means for driving the two cutter blade cylinders are much less stringent than before so that such means may be simple and inexpensive and will not be liable to be deranged.

The invention is shown only diagrammatically and by way of example in FIGS. 1 to 4.

It will be understood that the cutter blade cylinders will be dimensioned mainly in view of the cutting function to be performed because the maximum length of a sheet can be only an integral multiple of the circumference of the flight cylinder of the upper cutter blade cylinder. Just as in known cross cutters, shorter sheets may be cut if the surface velocities of the two cutter blade cylinders are increased relative to the velocity of the web. Besides, the lower cutter blade cylinder may differ in diameter from the upper cutter blade cylinder, provided that the above-mentioned geometric relations are provided between the leads of the helical cutting edges and the speed ratio between the two cutter blade cylinders. The speed ratio may equal any other integer if the sheet length and the diameters of the cutter blade cylinders are changed.

In order to ensure that the cut is performed at right angles to the web, the axes of the cutter blades suitably deviate from a direction which is at right angles to the web and extend at such an angle to the web that, e.g., when cutting the longest sheets, the helical cutting edges 15 and 16 produce a line of cut which is at right angles to the web so that the real line of cut coincides with the projection of the axis 17 on the web.

It is apparent from FIG. 1 that the number of flats 12 on the lower cutter blade cylinder 2 is desirably in a certain relation to the number of complete revolutions performed by the upper cutter blade cylinder 1 during a complete revolution of the lower cutter blade cylinder 2. The ratio of the number of revolutions of the upper cutter blade cylinder 1 to the number of complete revolutions of the lower cutter blade cylinder 1 is thus an integral multiple. To ensure that this will not result in damage to the cutting edges, the lower cutter blade cylinder 2 must be formed with at least three flats, which are regularly spaced on a circle and as indicated at 19 are set back from an imaginary cylindrical surface 18, which is defined by the remaining portions 20 of the periphery of the body of the lower cutter blade cylinder 2. At least three flats 12 will be required to ensure that damage to the cutting edges will be avoided if a speed ratio of 3:1 is selected, e.g., as shown in FIG. 2. Owing to considerations of safety and balance, four flats 12 have been provided in FIG. 1. Six flats will be desirable if the speed ratio is 5:1. With a speed ratio of 2:1, the theoretic minimum of three flats 12 will just be sufficient.

What is claimed is:

1. A cutting arrangement for cutting sheets from a continuously fed web, comprising, in combination, a pair of cutter blades respectively arranged on opposite sides of said fed web rotatable about axes extending substantially parallel to said fed web, said cutter blades having helical cutting edges extending along helixes having different leads and engaging each other along a cutting line; and drive means for rotating said cutter blades in opposite directions at different peripheral speeds, the ratio of which is equal to the ratio of said different leads of said helixes along which said helical cutting edges extend.

2. A cutting arrangement as set forth in claim 1 and including a pair of cutter rolls rotatable about said axes, said cutter blades being respectively fixed to said cutter rolls for rotation therewith about said axis, at least one of said blades having a cutting edge projecting beyond the peripheral surface of the respective roll.

3. A cutting arrangement as set forth in claim 2, in which the cutter blades of said cutter rolls have linear cutting edges, the diameter of an imaginary flight cylinder described by said cutting edge of at least one of said cutter rolls being smaller than the diameter of cylindrical surface portions of said one cutter roll, which cylindrical surface portions are disposed between a plurality of at least three flats which are formed on said one cutter roll, one of said flats lying in an imaginary plane which intersects the cutter blade of said flattened cutter roll, said flats being provided in a number which is at least three and exceeds by one the integral number representing the ratio of the surface velocities imparted to the cutter rolls owing to their different speeds.

4. A cutting arrangement as set forth in claim 2, in which at least one of said cutter rolls is formed with flats which are set back from a cylindrical surface which is defined in part by cylindrical surface portions at said one cutter roll, one of said flats lying in an imaginary plane which intersects the cutter blade of said flattened cutter roll, said cutter further comprising a resilient, stationary scraper which engages said cutter roll formed with said flats.

5. A cutting arrangement as set forth in claim 2, in which at least one of said cutter rolls is formed with flats which are set back from a cylindrical surface which is defined in part by cylindrical surface portions of said one cutter roll, one of said flats lying in an imaginary plane which intersects the cutter blade of said flattened cutter roll, said cutter further comprising a leaf spring disposed adjacent to that of said flats which intersects the cutter blade on said flattened cutter roll, said leaf spring succeeding the cutter blade of said flattened cutter roll in the direction of rotation thereof, the length of said leaf spring in a direction which is parallel to the axis of rotation of the associated cutter roll being equal to the dimension of said flattened cutter in said direction, means for gripping said leaf spring at a portion which is remote from the cutting edge of said cutter blade of said one cutter roll, said gripping means being disposed within the imaginary flight cylinder which is described by said cutting edge of said cutter blade during the rotation of said cutter roll, said leaf spring having a resilient width portion which is adjacent to said cutting edge and disposed outside said imaginary flight cylinder and adapted to be urged back into said imaginary slide cylinder by the cutter blade of the other cutter roll.

6. A cutting arrangement as set forth in claim 1, wherein the ratio of the peripheral speeds of said two cutter blades equal an integer other than one.

7. A cutting arrangement as set forth in claim 2, said drive means comprising drive shafts which form part of said cutter rolls and gears rigidly connected to said drive shafts, the number of teeth of the gear which is connected to the drive shaft of one cutter roll is lower than the number of teeth of the gear which is connected to the drive shaft of the other cutter roll in such a ratio that the integral number of complete revolutions performed by said one cutter roll exceeds the integral number of the complete revolutions performed by the other cutter roll in the same period of time.

8. A cutting arrangement as set forth in claim 1, in which said drive means are adapted to impart to one of said cutter blades an integral number of at least two complete revolutions during a complete revolution of the other cutter blade.

* * * * *